Nov. 29, 1932.  W. O. AMSLER  1,889,511
ROTARY GLASS MELTING FURNACE
Filed July 26, 1928  3 Sheets-Sheet 1
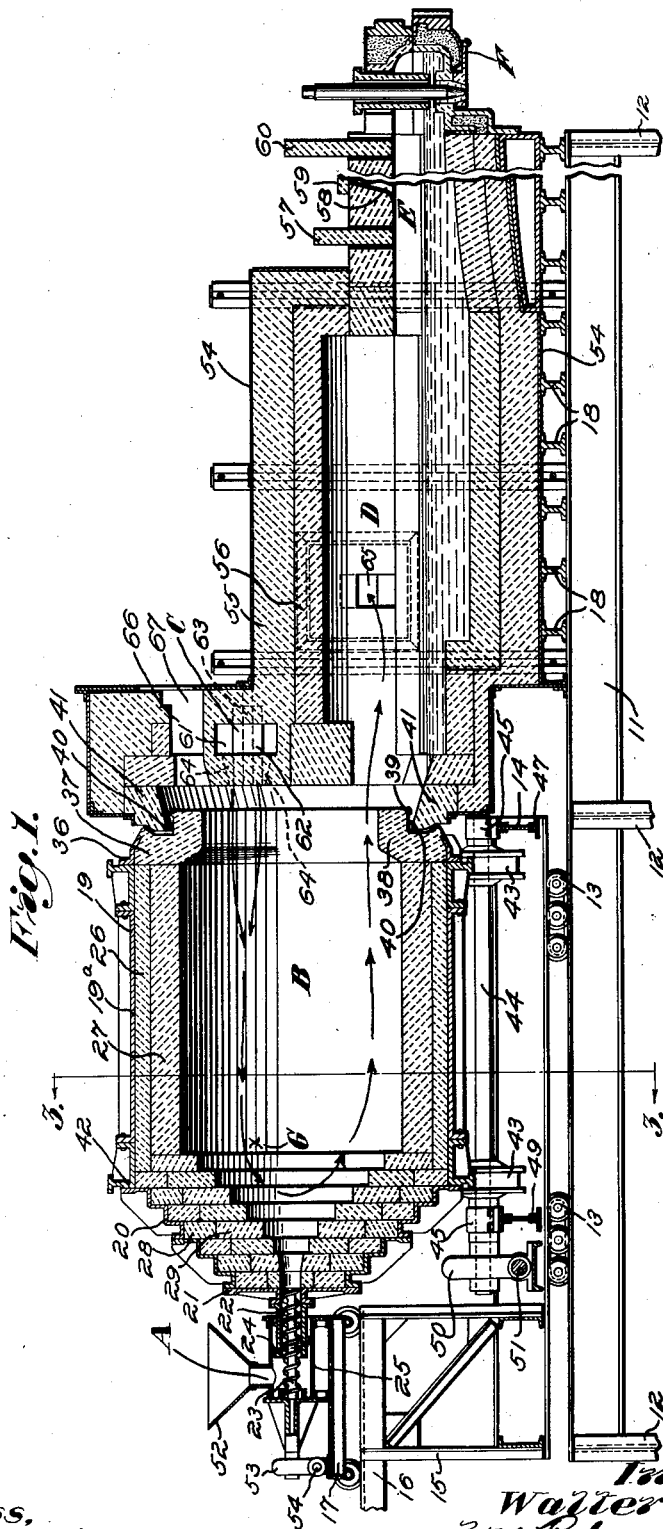

Nov. 29, 1932.  W. O. AMSLER  1,889,511
ROTARY GLASS MELTING FURNACE
Filed July 26, 1928   3 Sheets-Sheet 2
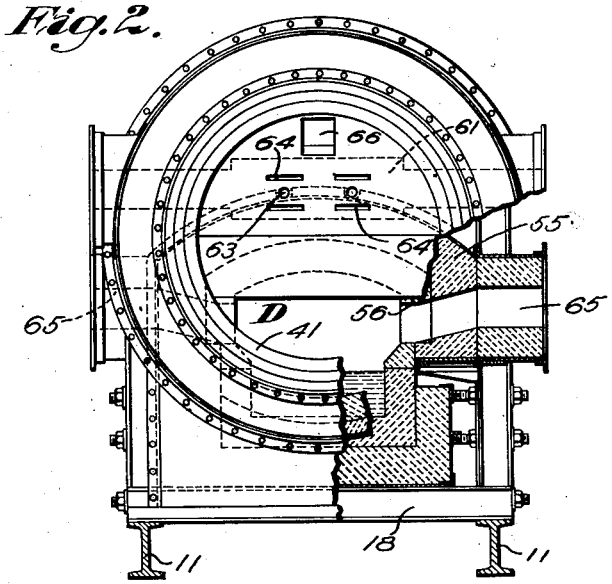
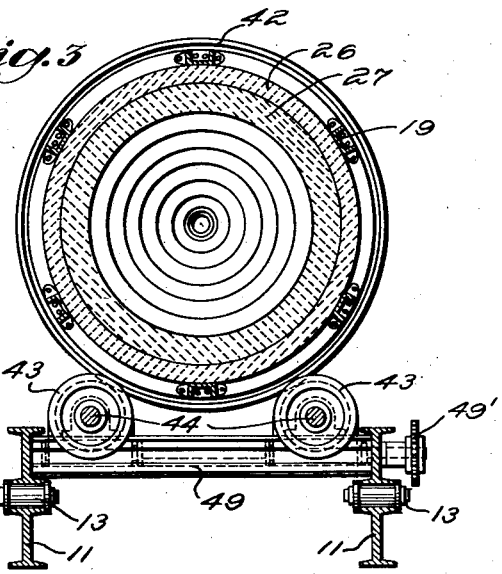

Nov. 29, 1932.    W. O. AMSLER    1,889,511
ROTARY GLASS MELTING FURNACE
Filed July 26, 1928    3 Sheets-Sheet 3
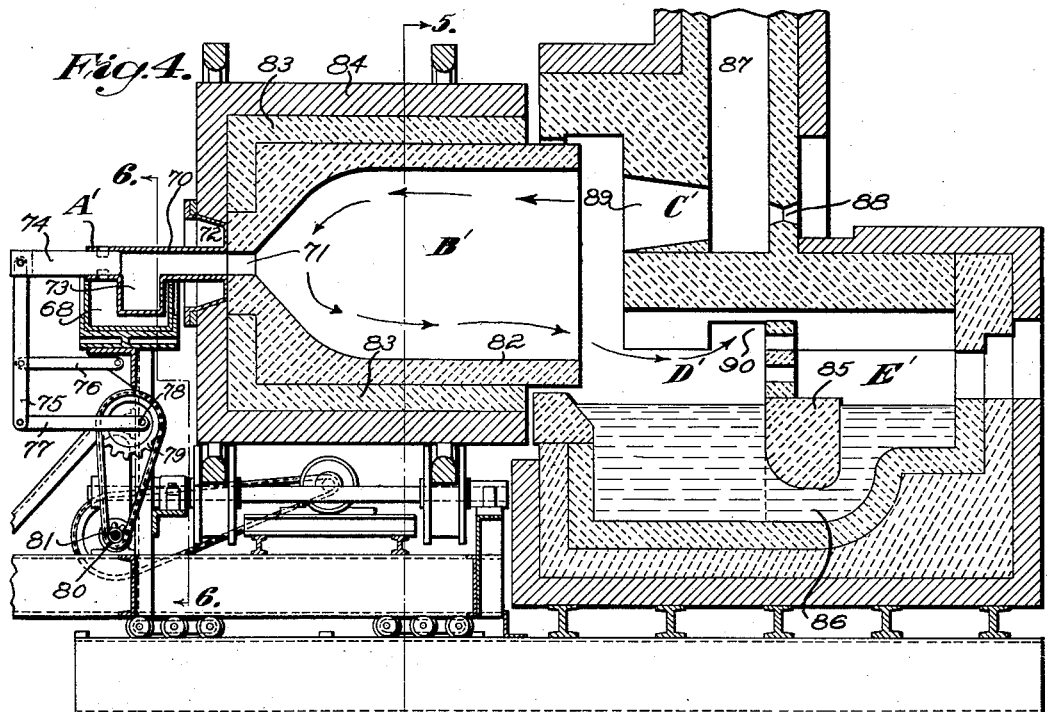
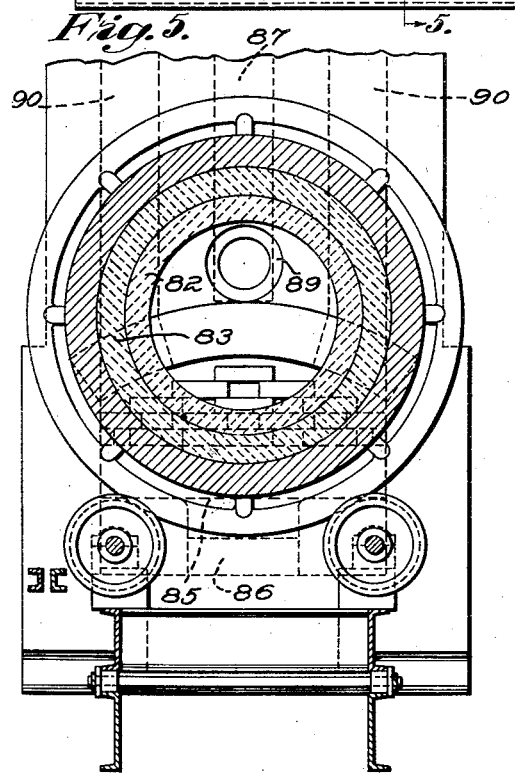
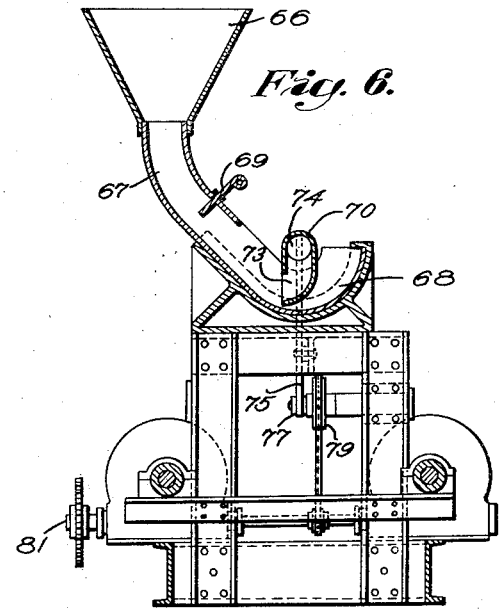
Inventor:
Walter O. Amsler Patented Nov. 29, 1932

1,889,511

UNITED STATES PATENT OFFICE

WALTER O. AMSLER, OF HARTFORD, CONNECTICUT, ASSIGNOR TO HARTFORD-EMPIRE COMPANY, OF HARTFORD, CONNECTICUT, A CORPORATION OF DELAWARE

ROTARY GLASS MELTING FURNACE

Application filed July 26, 1928. Serial No. 295,600.

My invention relates to method and apparatus for making glass for the production of glassware, and more particularly to apparatus of the type in which glass batch is continuously fed into and melted in a rotary melting compartment.

Generally speaking the objects of my invention are to provide a tank requiring a minimum of joints between the rotary parts and stationary parts, to provide therein a rotary melting chamber into which the batch may be continuously fed in a manner to present a continuous thin layer of batch to the heat of the furnace and to provide suitable heating means for applying the heating energy to the batch in a manner to facilitate rapid, complete and uniform fusion thereof.

A further object of the invention is to provide for repairs to the melting compartment with the least interruption of the production of the apparatus.

A still further object of the invention is to provide novel and effective methods of firing the apparatus.

It is also an object of this invention to provide novel and efficient batch feeding devices for continuously supplying the batch to the melting chamber.

Generally the structure of my invention comprises a melting tank or furnace in which the melting compartment is rotated about its substantially horizontal axis, the compartment comprising a cylinder, open at one end and provided at the other with a cone-shaped portion, provided at its apex and on the axis of rotation with a charging opening into which batch is fed continuously by a suitable continuous batch feeding device. The open end of the compartment is provided with a suitable over-hanging lip which extends into a cylindrical opening in a stationary part of the apparatus and over which the melted glass is delivered to a stationary receiving and refining chamber.

A burner or burners of novel construction are located in the stationary structure and are adapted to project a flame into the cylinder onto the batch in the conical end, and thence over the melted glass, the products of combustion taking a curved path and passing off through suitable openings provided in the stationary structure.

It has heretofore been proposed by me to construct a furnace with a rotary melting end, consisting substantially of a cylinder open at both ends and revolving between a pair of stationary furnace structures, in one of which the batch feeding and heat applying means are provided, while in the other there is the receiving or refining chamber and the opening for the disposal of the gases of combustion. Such a structure involves the problem of suitable tight joints between the two open ends of the cylinder, which problem is greatly minimized by my present invention. Also in the prior structure, the distribution of the glass batch and the application of flame thereto is less efficient than in the present invention. Also the presence in the prior structure of the two stationary structures makes the removal and repairing of the rotary compartment more difficult.

Among the problems involved in efficient continuous glass melting is that of presenting the batch fed into the furnace in a manner in which the batch is distributed over a large area and at a slight depth and is properly presented to the place at which the greatest heat energy is released, to the end that the glass will be completely fused at a high rate. This problem is complicated by the presence in the furnace of currents of gases of combustion having high velocity which tend to carry off the lighter materials of the unmelted batch mixture, with the result not only that the stacks, recuperators, etc. become clogged, but the glass itself, having been robbed to a greater extent of some of its components than of others, has not, when melted, the chemical and physical characteristics desired.

Lighter portions of batch are also deposited upon the surface of the glass in process of refining, causing the formation of bubbles where they are difficult to remove.

My invention is peculiarly adapted to introduce the batch into the furnace with a minimum of loss caused by the gases in the furnace, and to present it in the desired widely spread thin layer to the effective action of the flame.

Another of the problems in efficient glass making is the elimination of bubbles of included air and the gases accompanying the chemical changes in the batch during fusion and the suitable and intimate mixture of the various silicates formed by the melting of the batch. This problem is one of highest importance and has heretofore been but inadequately solved. This is particularly true of the stationary furnaces of the prior art, in which the solution of this problem has depended largely upon the creation of convection currents in the bath of glass being melted and fined, and upon the movement of the gases themselves. With a rotary type of furnace, such as that shown in my application, the rotation agitates the glass during the melting operation, and tends to thoroughly mix the various silicates formed and tends to facilitate the elimination of the bubbles.

By heating the rotating compartment in the manner provided by this invention, I assure the symmetrical heating of the glass in the batch and avoid the difficulties attendant upon stratification due to difference in temperature of the several portions of the glass.

The melting end of a glass furnace is always subjected to more severe service than other portions thereof, and therefore requires repair more often than other portions. The arrangement of the tank of my invention is such that such repairs may be made with a minimum of interruption in the production of the furnace. The provision of the single open-ended compartment and the particular mounting thereof permits ready removal of the melting compartment from its position in front of the stationary portion of the furnace and the substitution of another melting compartment when repairs become necessary. Also my apparatus is such that the time usually lost in draining a tank is reduced to a minimum.

Further advantageous features of my invention will appear from the following specification and claims.

I have illustrated my invention in the preferred form in Figs. 1 to 3a inclusive, while a modified or alternate form is shown in Figs. 4 to 6. In the drawings, Figure 1 is a longitudinal vertical section of a glass melting tank, in which are embodied structural features of the present invention;

Fig. 2 is an end view of the glass receiver looking from the left with the cylindrical melting chamber removed and a portion of the receiver broken away;

Fig. 3 is a vertical section taken on the line 3—3 of Fig. 1;

Fig. 3a is a section through one of the bearing blocks 45, illustrating the means for adjusting such blocks with respect to the support;

Fig. 4 is a longitudinal vertical section of a modified form of tank;

Fig. 5 is a transverse section taken on the line 5—5 of Fig. 4; and

Fig. 6 is a transverse section taken on the line 6—6 of Fig. 4.

Referring particularly to Figs. 1 to 3a inclusive, there is shown a structure comprising a glass batch feeding mechanism A, a rotary melting compartment B, a stationary heating device C, a receiving or refining chamber D, a workout or tempering chamber E, and an automatic glass feeder F. All of these parts are supported by a suitable frame here shown as comprising I-beams 11 supported on the floor of the factory by suitable legs or supports 12. The portion of this frame beneath the rotary compartment B and the batch feeder A comprises a track for rollers 13 mounted on a suitable carriage 14 upon which in turn is mounted the rotary compartment B and its rotating mechanism, and a supporting structure or frame 15 which carries a track 16 to support a roller carriage 17 for the batch feeding mechanism A. The opposite end of the frame 11 carries a suitable base structure, here shown as the I-beams 18, which are supports for the stationary portions C, D, E and F of the apparatus.

The rotary melting compartment B comprises a generally cylindrical metal frame structure 19 formed of rings 42 connected by longitudinal braces 19a and a substantially cone-shaped metal casing 20 enclosing one end thereof, which casing may be made in steps as shown in Fig. 1. This casing terminates in the metal plate 21 from which extends a cylindrical extension 22 having an axis coincident with the axis of rotation of the rotary tank and adapted to receive a screw batch conveyor 23. The extension 22 is provided with external screw flanges 24 designed to cooperate with the inner walls of a larger cylindrical casing 25 forming part of the batch conveyor to prevent loss of batch from the batch feeder.

The structures 19 and 20 are suitably lined with refractory material. For this purpose, I preferably employ first a lining 26 which is of high heat insulating refractory material and within this a second lining of flux blocks 27 which is preferably made of high-grade glass resisting material, such for instance, as that described in the U. S. patent to Paul G. Willetts, No. 1,605,885, dated November 2, 1926. The linings 26 and 27 of the cone-shaped end may be preferably formed as shown in Fig. 1 by blocks 28 and 29 of material corresponding to the lining 26 and flux blocks 27 respectively and which have a stepped relation, though they may be made in any other suitable manner, such for instance as that shown in Fig. 4. At the forward end of the cylindrical melting chamber B, I provide a suitable metal casing 36 securely fastened to the frame 19, which casing is lined with lip blocks or lip structure 37, which, as shown in Fig. 1, is preferably of such form as to form a low dam 38 for the glass, an overhanging lip 39 and a recess 40 into which blocks 41 of the stationary structure, comprising the melting compartment D and the heating structure C, project to form a suitable joint between the rotary and stationary structures. Support and rotary movement are imparted to the compartment B through metallic rings 42 which rest upon and are driven by the grooved rolls 43 carried by shafts 44 which are journaled in adjustable bearing blocks 45 carried by the cross beams 47 and 49 of the frame 14. Beyond the rearward bearings 45 the shafts carry worm wheels within the casings 50 designed to cooperate with worms 51 driven from any suitable source of power (not shown) through a sprocket 49' to impart rotary movement to the shafts 44 and hence to the rotary compartment B.

As shown in Fig. 3a, the bearing blocks 45 are mounted upon the cross beams 47 and 49 to provide adjustment of their vertical positions. Each block is provided with bolts 46 passing through the beam 47 or 49 carrying nuts 46'. The blocks are also provided with jack bolts 48, by which the vertical distance between the bearing blocks and the cross beams may be varied. After adjusting this distance, the nuts 46' are drawn up to hold the bearing block firmly in the adjusted position. Thus either or both ends of the rotary compartment may be raised or lowered to bring the compartment into proper relation with the opening in the stationary structure and to give to it the desired tilt.

Batch is continuously fed into the cone-shaped end of the rotary compartment B by the batch feeding mechanism A which comprises the frame 17 mounted on rollers upon the track 16 for longitudinal movement toward and from the compartment B. The casing 25 is supplied with a suitable hopper 52 in which the supply of batch is maintained and from which the batch passes into the cylinder 25. A suitable screw conveyor 23 passes longitudinally of the cylinder 25 and into the cylindrical extension 22 of the rotary compartment B, the conveyor being carried upon a shaft which passes rearwardly through and out of the cylinder 25 through suitable bearings and carries adjacent its end a worm wheel enclosed in a casing 53 and adapted to be driven through a worm on the shaft 54 from a source of power (not shown). The arrangement of the batch feeding mechanism A is such that the batch contained in the hopper moves by gravity into the cylinder 25 and is carried by the screw conveyor 23 into the cone-shaped end of the rotary conveyor B. Such portion of the batch as may not be directed into the cylindrical extension 22 and which tends to pass between the cylinders 22 and 25 is engaged by the screw flanges 24 which are rotated by the rotation of the compartment B and are forced back into the cylinder 25. By the arrangement illustrated, the batch feeding mechanism may be readily removed from its operative position when it is desired to remove the melting end of the tank for repairs or for any other reason.

The stationary portions of the apparatus comprise a suitable metal casing 54 supported upon the I-beams 18 and lined preferably with suitable heat insulating material 55 which in turn is lined by flux blocks 56, which are also preferably of the material described in the aforesaid Willetts' patent. The receiving and refining chamber D is provided at its rearward end with suitably shaped blocks 41 adapted to cooperate with the blocks 37 of the rotary compartment B for receiving the glass continuously passing over the lip 39. The compartment D is of suitable size and shape to contain the melting glass received from the melting compartment to permit its final settling and refining and to convey it to the workout chamber or workout end E through which it passes to feeder F. The refining compartment and the workout compartment may form one continuous structure or it may be heat separated by a suitable partition or shade damper 57, whereby the heat condition in the several compartments may be separately regulated.

The workout compartment E may be of any suitable construction, but is preferably of the type to provide an exponential flow channel such as is described in my U. S. patent application filed April 18, 1927, Serial No. 231,037 now Patent No. 1,845,824, issued Feb. 16, 1932. To provide for cooling the glass in this chamber, as the top insulation 55 is removed therefrom, also I provide a damper controlled opening 58 controlled by a damper 59 which may be open to adjustable extents to control the rate of radiation of the heat from the glass to the atmosphere. I also provide a flow controlling and shutting-off gate 60 by which the rate of flow from the furnace into the feeder forehearth may be regulated or by which the supply of glass to the feeder may be cut off, if desired, to permit removal of or repairs to the feeder or for other reasons.

The heating device C forms a part of the rearward portion of the upper structure of the receiver or refining chamber. The details of this device are best shown in Figs. 1 and 2. As there shown, the refractory walls are formed with an upward offset portion which contains a transverse passage 61 communicating with a recuperator system for introducing into the structure the air to support combustion. Transversely of this passage 61 and projecting to the rearward face of the offset is a block or blocks 62 having an opening 63 through which the fuel is introduced into the compartment B, and on either side of this block are provided wedge-shaped openings 64 through which the air admitted through the passage 61 is projected into the compartment. The air and fuel is thus projected into the rotary compartments toward the cone-shaped end thereof and are preferably so regulated that combustion is completed at or near the point marked G, whereby the greatest energy is released on the layer of batch in the cone. After playing upon the batch as it is fed and spread about the inner end of the cone-shaped portion, the flame moves in the directions of the arrows (Fig. 1) over the surface of the melting glass and over the lip 39 through the rearward end of the refining compartment D and out through the openings 65 provided on either side of that compartment to the recuperator and the stack.

Above the heating device and in the upwardly offset portion of the stationary structure is provided an observation opening 66 which is normally closed during operation by a suitable clay plug 67 which may be removed to permit observation of the melting conditions in the tank.

The operation of the device above described is preferably as follows: The parts being in the position shown in Fig. 1, the bearing blocks 45 being adjusted to give the proper slope, if any is desired, to the melting compartment and to bring it into suitable cooperative relation with the stationary parts of the device, a supply of batch being present in the hopper 52 and the structure having been brought to a suitable temperature, the feed screw 23 and the rotary compartment B are rotated at suitable selected speeds. The batch is thus fed through by the batch feeding device A into the substantially conical end of the rotary compartment B at a proper rate and is spread by the rotary motion of the compartment in a thin layer substantially about the interior of the cone. The flame, playing thereon, rapidly reduces this layer as it is renewed, to glass, which glass flows down the steps of the cone-shaped portion while at the same time being circulated by the rotary motion of the compartment and into the cylindrical portion of the container. By the time that it arrives at the cylindrical portion, the fusion as such is substantially complete. The rotation of the melting compartment thoroughly mixes the various silicates formed and facilitates the release of the gases and included air in the glass. Because of the particular heating arrangements, the heat applied to the inner surface of the glass during rotation and to the portion of the glass next to the refractory is substantially the same, as each portion of the lining of the compartment B is exposed to the heat of the flame at all times when not actually beneath the glass, so that at each longitudinal portion of the melting compartment, the glass is at substantially the same temperature throughout its depth and the heat is thus symmetrically applied throughout the melting compartment. As the glass moves forward, it arrives at the dam 38 over which it flows in a thin layer into the receiver or refining compartment, where it forms a shallow bath in which the refining is completed and the temperature somewhat reduced as it moves forward toward the workout chamber. The temperature of the refining chamber is not so high as that in the rotary chamber, but is still maintained, through the provision of the insulation, sufficiently high to complete the refining operation. The heat condition of the glass is preferably maintained substantially uniform throughout each transverse cross section of the refining chamber, so that a full cross-sectional flow is maintained. If desired, and particularly if the full cross-sectional flow is not maintained, a suitable bridge wall and throat may be interposed in the refining chamber. As the glass moves toward the workout end, it becomes progressively cooler and approaches the working temperature and this reduction of the temperature is promoted in the workout chamber by the use of the shade damper 57. The glass may be further cooled by radiation of its heat through the uninsulated upper portion of the workout chamber and by the use of the temperature control opening 58. By the time the glass has passed through this chamber, its temperature is substantially that required for the automatic feeder.

As stated, the service conditions surrounding the melting end of the furnace are more severe than those of the receiving, refining and workout portions. When repairs become necessary in the refractory or other parts of the melting end, ready and easy removal of the rotary structure and a substitution of a new part may be accomplished. To effect this removal, the operation of the feeding mechanism may be discontinued prior to discontinuance of the heat application, and the batch receiver removed by rolling it on its track away from the revolving compartment. The opening in the cone-shaped end may be closed by suitable clay plugs and the bearing blocks 45 may be adjusted to tilt the furnace to the limits allowed by the fit of the blocks 36 and 47. In this way, the supply of glass in the compartment B may be readily and quickly reduced, after which the adjustment of blocks 45 be reversed and the tank with a very thin layer of glass on its refractories may be moved bodily away from the stationary structure and a new rotary compartment supplied.

One of the chief advantages of the arrangement provided by my furnace is that it is unnecessary to maintain large bodies of glass or of structure at the necessary melting and refining temperatures and that the glass can be melted at the rate desired and rapidly passed through the device to the glass feeding apparatus. The arrangement also provides a ready and effective means by which the glass made and delivered to the feeder arrives at the feeder in a uniform period of time and with a uniform glass history, thus assuring a uniform good quality of glass for the further manufacture of glassware.

In Figs. 4 to 6 inclusive, I have shown a modified form of apparatus wherein the batch feeding mechanism A' is substituted for the device A of Figs. 1 to 3; the rotary melting compartment B' for the compartment B from which it differs in certain structural respects; the heating means C' which provides a somewhat different arrangement of parts, for the heating means C, and the receiver or refining and workout compartments D' and E' for the chambers D and E. The automatic glass feeder F is omitted and the workout chamber is shown as arranged for hand feeding.

The batch feeder A', like the batch feeder A, is adapted substantially continuously to feed quantities of batch into the melting compartment through an opening on the axis of rotation of the compartment onto the cone-shaped portion, where it is spread in the desired thin widely spread layer. The batch feeder comprises a hopper 66 for a supply of batch communicating, by a passage 67, with the chamber 68. The rate of feed of batch to the chamber 68 may be controlled by a gate 69. A cylindrical part or tube 70 registering with the axial opening 71 of the rotary chamber B' and fast to the compartment B' for rotation therewith, serves to carry the batch from the chamber 68 to the melting compartment. The part 70 may be provided with means, as the annular chamber 72, through which a cooling medium may be circulated to prevent the part from becoming overheated by the heat of the furnace and the premature melting of the batch. The part 70 is provided with a scoop portion 73 which dips into the chamber 68 to periodically supply the tube with suitable quantities of batch. A plunger or pusher 74 mounted for reciprocation in the part 70 in suitable timed relation to the movements of the scope 73 and serves to push the glass batch collected by the scoop through the cylinder 70 and into the melting compartment B'. The reciprocation of the plunger may be accomplished by any suitable mechanism, here shown as the levers 75, 76 and 77 and the eccentric 78 operated by the sprockets 79 and 80, the latter of which is mounted on the shaft 81 which drives the mechanism for rotating the melting chamber B' and therefore the tube 70 and scoop 73.

In operation the cylinder 70 is continuously rotated with the melting chamber B' and the scoop 73 is periodically carried through the lower portion of its orbit, as shown in Fig. 6, where it dips into the batch. It then moves to the inverted position and the batch collected is presented in line with the tubular portion of the device. The operation of the plunger 74 is so timed that it is withdrawn to the rear of the scoop until the batch has been deposited in line with the tubular opening when it is moved forward toward the melting chamber to push the batch thereinto.

The melting compartment B' is quite similar to the compartment B. The stepped construction of the cone-shaped portion of the compartment B gives place to a smooth cone in the compartment B'. The dam 38 is omitted in the compartment B' and the inner lining 82 projects beyond the other refractories into the stationary structure. An additional lining 83 of refractory material is shown interposed between the glass resisting lining 82 and the insulation 84. The details of the drive are slightly different from those of the form of Figs. 1 to 3 inclusive, but save for the interconnection of the drives for the rotary chamber B' and batch feeder A' above described, these differences need not be described in detail.

The refining chamber D' and the workout chamber E' of the modification of Figs. 4 to 6 are shown as separated by a bridge wall 85 and communicating by a throat 86.

The heating device C' comprises a vertically extending duct 87 for the air for supporting combustion of the oil or gas from a burner (not shown) which is adapted to project fuel through the opening 88, and has a rearwardly extending opening 89 from the duct 88 into the melting compartment B'. Disposed at the sides of the glass receiver or refining compartment D' are vertically extending exhaust ducts 90 which are adjacent to the receiving air duct 87, as may best be seen in Fig. 5. By this arrangement, the flame as in the structure of Figs. 1 to 3, is projected toward the cone-shaped end upon the layer of batch and thence passes, as shown by the arrows, over the glass in the compartment B', over the glass in the receiver D' and into the recuperator by way of the ducts 90. The arrangement of the ducts 87 and 90, here shown and described, results in a compact and highly efficient means for transmitting heat from the outgoing to the incoming gases.

In the modified form of Figs. 4 to 6 the melting compartment may be readily removed and a new compartment substituted, the rotary compartment as a whole being mounted on wheels for movement from the stationary structure.

It is thus seen that I have provided apparatus, for effectively accomplishing the above recited objects and embodying the advantages enumerated, as well as other obvious advantages. The described embodiments of the invention are for the purpose of illustration only, and various modifications may be made therein without departing from the spirit and scope of the invention, as defined in the appended claims.

I claim:

1. Apparatus for continuously melting glass comprising a melting chamber of cylindrical form, means for rotating said chamber about its axis, means for introducing batch into one end of said chamber, and means for introducing and removing the heating medium through the other end of said chamber.

2. Apparatus for the continuous melting of glass comprising a melting chamber of cylindrical form disposed with its axis substantially horizontal, means for rotating the chamber about its axis, means for continuously introducing batch at one end of said chamber, and means for introducing and discharging heating gases at the end of said chamber opposite to that through which the batch is fed.

3. Apparatus for continuously melting glass comprising a melting chamber having a substantially cylindrical body portion with its axis substantially horizontal, and having at one end a cone-shaped closure, means for rotating said chamber about its axis, an axial aperture for feeding batch at the cone-shaped end of said chamber, and means for introducing and discharging a heating medium at the other end of said chamber.

4. Apparatus for the continuous melting of glass comprising a melting chamber having a body portion of substantially cylindrical form having one end in the form of a stepped cone and the opposite end thereof open, means for rotating said chamber about its axis, means for feeding batch at the apex of said cone, and means for introducing and discharging heating gases through the open end of said chamber.

5. Apparatus for the continuous melting of glass, comprising a melting chamber having a substantially cylindrical form with its axis disposed substantially horizontally, one end of said chamber having a closure provided with an axial aperture therein, means for feeding batch through said aperture, a stationary receptacle for glass into which the opposite end of the melting chamber projects, means associated with said stationary receptacle for introducing and discharging a heating medium into said melting chamber, and means for rotating the melting chamber about its axis.

6. Apparatus for continuous melting of glass, comprising a melting chamber having a cylindrical form with its axis disposed substantially horizontally, one end of said chamber having a cone-shaped closure with an axial aperture therein for the introduction of batch into the chamber, a stationary structure having a cylindrical socket with which the opposite end of the melting chamber registers, means in the upper portion of said stationary structure for introducing a heating medium into said melting chamber, a receptacle in the stationary structure for the molten glass discharging from the melting chamber, and means associated with said receptacle for discharging the gases of combustion.

7. Apparatus for the continuous melting of glass, comprising a horizontally disposed cylindrical chamber having one end thereof substantially closed and the other end thereof substantially open, means for rotating said chamber about its axis, means for feeding batch at said closed end, a stationary structure having a cylindrical socket within which the open end of said chamber rotates, means in the upper portion of said socket for projecting fuel into the upper portion of said chamber longitudinally thereof, an air duct in said structure for the introduction of air into said chamber adjacent to the fuel to support the combustion thereof, a glass receptacle in the lower portion of said structure for the reception of glass from said chamber and into which the products of combustion pass from said chamber, and a discharge duct to carry away said products of combustion from said receptacle, said discharge duct extending parallel and adjacent to said air duct whereby the waste heat passing through said discharge duct preheats the air for the fuel.

8. In apparatus for the continuous melting of glass, a rotary melting compartment and a stationary structure comprising a glass receptacle and heating means associated therewith and provided with a cylindrical opening with which one end of the rotary melting chamber registers, and means for moving the rotary compartment into and out of register with said stationary structure.

9. In apparatus for the continuous melting of glass, a rotary melting compartment substantially closed at one end by a cone-shaped portion integral therewith, a stationary structure comprising a glass receptacle and heating means associated therewith and provided with a cylindrical opening with which the open end of the rotary melting chamber registers, a batch feeding device associated with the substantially closed end of the melting compartment, and means for moving the melting chamber and batch feeding device longitudinally of the receptacle into and out of register with said stationary receptacle.

10. A glass melting tank comprising a stationary receiver and firing apparatus, and a rotary melting chamber, said tank comprising but one joint between the rotary chamber and the stationary receiver and firing apparatus.

11. The method of making glass which comprises continuously feeding glass making batch into one end of a rotating annular compartment of substantial length, introducing a heating medium into the opposite end of said compartment to melt said glass batch and to heat the exposed portions of the inner wall of said compartment, causing the molten glass to move continuously longitudinally of said compartment while also subjected to mixing and refining influences caused by the rotation of said compartment and the action of said heating medium, and discharging molten glass continuously from the second end of the rotating compartment.

12. The method of making glass which comprises continuously feeding glass making batch into one end of a rotating annular compartment, introducing a heating medium into the opposite end of said compartment and guiding said medium close to the upper wall thereof, deflecting said medium at the batch receiving end of said compartment and diverting it against the lower portion of said compartment and discharging the molten glass and products of combustion from said opposite end of the compartment whereby said heating medium is brought into close contact with the walls, batch and molten glass throughout its entire path.

13. The method of melting glass which comprises continuously spreading a thin layer of batch over a conical end of a rotary melting compartment, introducing heat into said compartment through the end opposite to said conical end, and removing the products of combustion and the melted glass through the last mentioned end.

14. Apparatus for the continuous melting of glass, comprising a cylindrical chamber adapted to be rotated about its axis and having a batch feeding aperture axially disposed in one end thereof, a tube concentric with said aperture secured to said chamber and extending outwardly from said chamber, a stationary batch feeding compartment having a cylindrical passage therein into which said tube extends, a helical flange surrounding said tube and rotatable therewith, a screw rotatably mounted in said batch feeding compartment and extending into said tube, means for rotating said screw conveyor to push batch into said chamber, and means for rotating said chamber and tube whereby the batch surrounding said tube is pushed into the compartment.

15. A removable batch feeding device for a rotary glass melting tank comprising a tank, a batch feeding tube extending outwardly from said tank, said tube being disposed with its axis in the axis of rotation of said tank and secured thereto, a stationary batch feeding compartment adapted to be withdrawn longitudinally of said tube and having an aperture into which said tube extends, a screw conveyor mounted for rotation in said compartment and disposed so as to slide into said tube as said tube slides into said compartment, and a helical flange on the exterior of said tube to push the batch lying outside of the tube into the compartment.

Signed at Hartford, Conn., this 23rd day of July 1928.

WALTER O. AMSLER.